United States Patent [19]

Nixon, Jr.

[11] Patent Number: 4,554,748
[45] Date of Patent: Nov. 26, 1985

[54] MULTI-SEGMENT SEAL RING FOR ROTARY EQUIPMENT

[76] Inventor: Robert J. Nixon, Jr., 2112-22nd St., Rock Island, Ill. 61201

[21] Appl. No.: 708,628

[22] Filed: Mar. 5, 1985

[51] Int. Cl.⁴ ............................................. F16J 15/24
[52] U.S. Cl. .................................... 34/242; 277/101; 277/128; 277/194
[58] Field of Search ............... 277/101, 126, 128, 192, 277/194, 199; 34/108, 242; 432/242

[56] References Cited

U.S. PATENT DOCUMENTS

| 1,671,161 | 5/1928 | Perks | 277/128 |
| 2,937,037 | 5/1960 | Woolsey | 277/101 |
| 3,298,698 | 1/1967 | Condon | 277/101 |
| 4,502,702 | 3/1985 | Nixon, Jr. | 277/101 |

Primary Examiner—Larry I. Schwartz
Attorney, Agent, or Firm—Henderson & Sturm

[57] ABSTRACT

A multi-segment seal ring for rotary equipment of the type involving a relatively large-diameter rotary cylinder supported with its axis horizontal by one or more fixed housings, seals being employed between the cylinder and at least one of the housings. One problem in equipment of this type is the practical impossibility of manufacturing and maintaining the cylinder as a perfect cylinder and special sealing structures are typically employed to accommodate out-of-round conditions of the cylinder, an example of which forms the subject matter of copending U.S. application, Ser. No. 618,984, filed June 8, 1984, now U.S. Pat. No. 4,502,702. The present invention provides improvements in the configuration and sealing of the gaps that occur at the overlapping, radial interfaces between neighboring segments, particularly to the end of increasing the efficiency of the equipment by eliminating or at least minimizing packing of treated material in the gaps.

7 Claims, 8 Drawing Figures

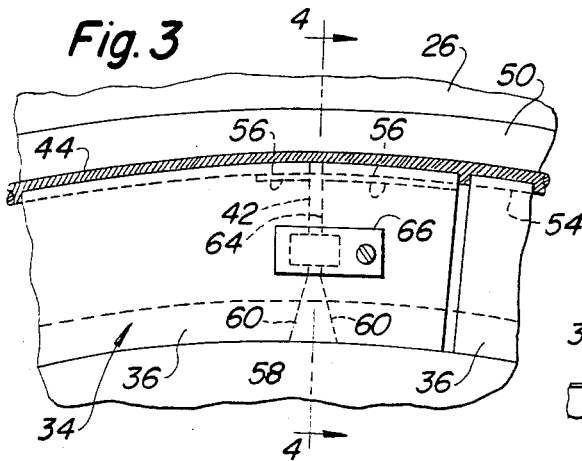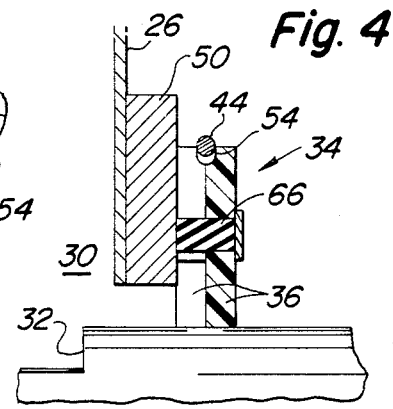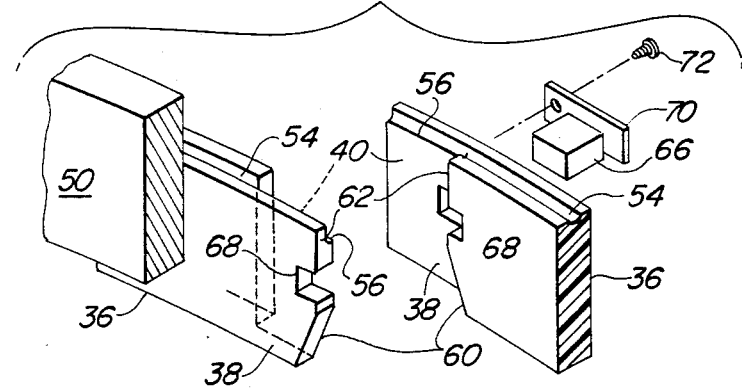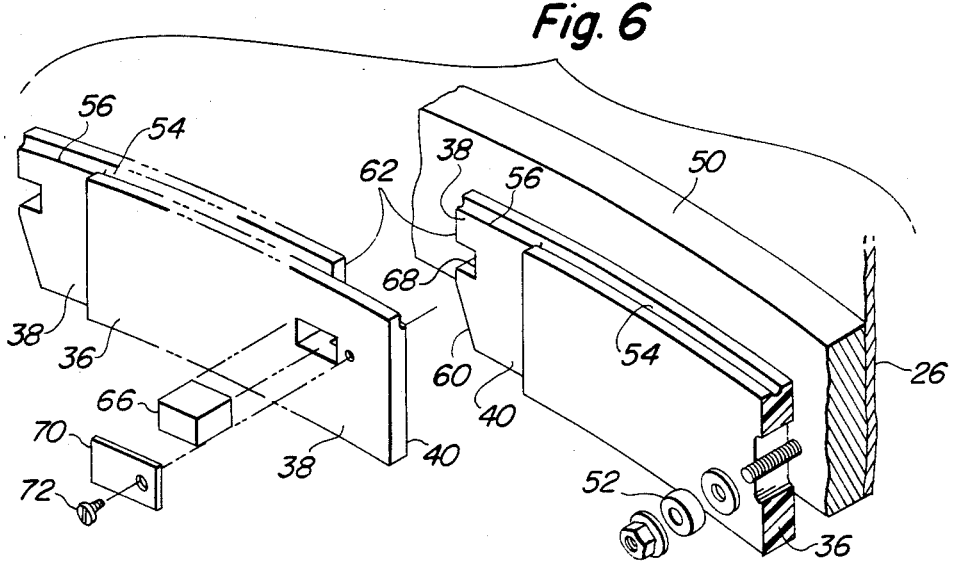

Fig. 7
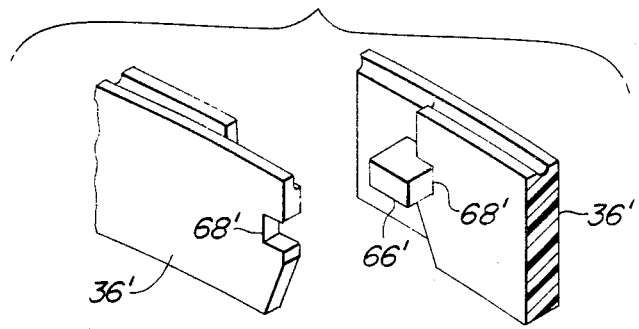
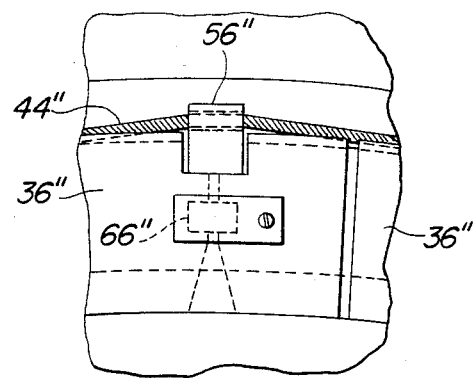
Fig. 8

MULTI-SEGMENT SEAL RING FOR ROTARY EQUIPMENT

BACKGROUND AND SUMMARY OF THE INVENTION

The invention relates to sealing structure for rotary equipment of the type in which a relative large-diameter cylindrical shell is supported with its axis horizontal by inlet and discharge housings, arrangements of this character being commonly employed in the treatment—e.g., heating, cooling, drying, etc.—of granular and like material, as by heating, cooling, etc. tubing extending through the shell. Because the size of the shell militates against the manufacture and maintenance thereof as a perfect cylinder, special sealing problems exist between the shell and its fixed related housings, the out-of-round condition of the shell magnifying the possibility of material leakage at the junctions of the shell and housings. These problems have been met, in large part, by the provision of one form or another of segmented seal ring at the areas in question, whereby the sealing ring can accommodate and follow the out-of-round condition of the shell. Copending U.S. patent application Ser. No. 618,984, filed June 8, 1984, now U.S. Pat. No. 4,502,702, contains as its subject matter a form of segmented seal ring upon which the present invention comprises one or more improvements.

In the structure referred to above, each pair of neighboring segments is provided with overlapping end portions that cooperate to form a gap and radial interface at the junction of the segments. As the cylindrical shell rotates, its slightly "ovalized" shape is accommodated by the segments as they move circumferentially and radially in response to "high spots" on the shell. Thus, the circumferential dimension at each gap constantly changes. The presence of the gaps invites the entrance of material into the gaps, each of which is normally formed by spaced apart parallel edges of the neighboring end portions of the segments. Material, especially of soft, relatively moist nature, tends to pack solidly in the gaps and ultimately creates a situation in which the seal ring not only increases in diameter but loses its flexibility and thus its sealing effectiveness is diminished if not destroyed.

According to the present invention, packing of material in the gaps is prevented or at least materially minimized by providing each gap with a relatively wide mouth at the arcuate inner edges of the segment end portions where these arcuate edges ride the shell, together with a sealing element blocking the gap at the junction of the mouth and the adjoining narrow part of the gap. Hence, the material has more room to work its way out of the mouth, especially since the mouth is shaped with radially outwardly converging walls. The location of the flexible sealing element at the point noted prevents the material from entering and packing into that portion of the gap radially beyond the mouth, that portion being conveniently formed by closely circumferentially spaced apart parallel radial edges. Further features and advantages of the invention will become apparent to those versed in the art as preferred embodiments are disclosed in detail in the ensuing description and accompanying sheets of drawings.

DESCRIPTION OF THE DRAWINGS

FIG. 3 is a further enlarged portion of the structure shown in FIG. 2.

FIG. 4 is a section on the line 4—4 of FIG. 3.

FIG. 5 is an "exploded" perspective of neighboring sections and especially illustrating the cooperating, overlapping end portions.

FIG. 6 is a similar perspective but drawn to show the side opposite that of FIG. 5.

FIG. 7 is a perspective similar to FIG. 5 but showing a modified form of the invention.

FIG. 8 is a view similar to FIG. 3 but showing a modified form of cable wrap as applied to the segments.

DESCRIPTION OF PREFERRED EMBODIMENTS OF THE INVENTION

Figure 1:
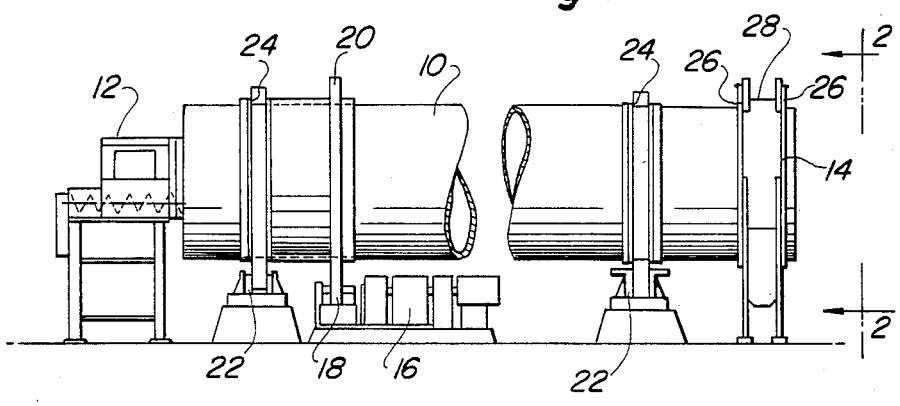
FIG. 1 is a side elevation of a typical rotary apparatus of the type in which the invention finds particular utility.

An overview of the basic environmental structure involved in the rotary equipment of the character previously referred to herein will be obtained from FIG. 1, wherein the numeral (10) designates a relatively large cylindrical shell associated at one end with an inlet housing (12) and associated at its other end with a discharge housing (14). The cylinder or shell is shown as being driven by an electric motor (16) having a pinion (18) in mesh with a ring gear (20) affixed to and encircling the shell. Support for the rotary shell is furnished by a pair of sets of rollers (22) on which ride shell-encircling bands or tires (24). As pointed out in the copending application, the shell may have a diameter upwards of four feet or more and is formed of sheet steel or the like. In basic operation, material to be treated within the shell is introduced at the inlet end (12) and progresses lengthwise or axially of the shell to exit at the discharge end (14).

Figure 2:
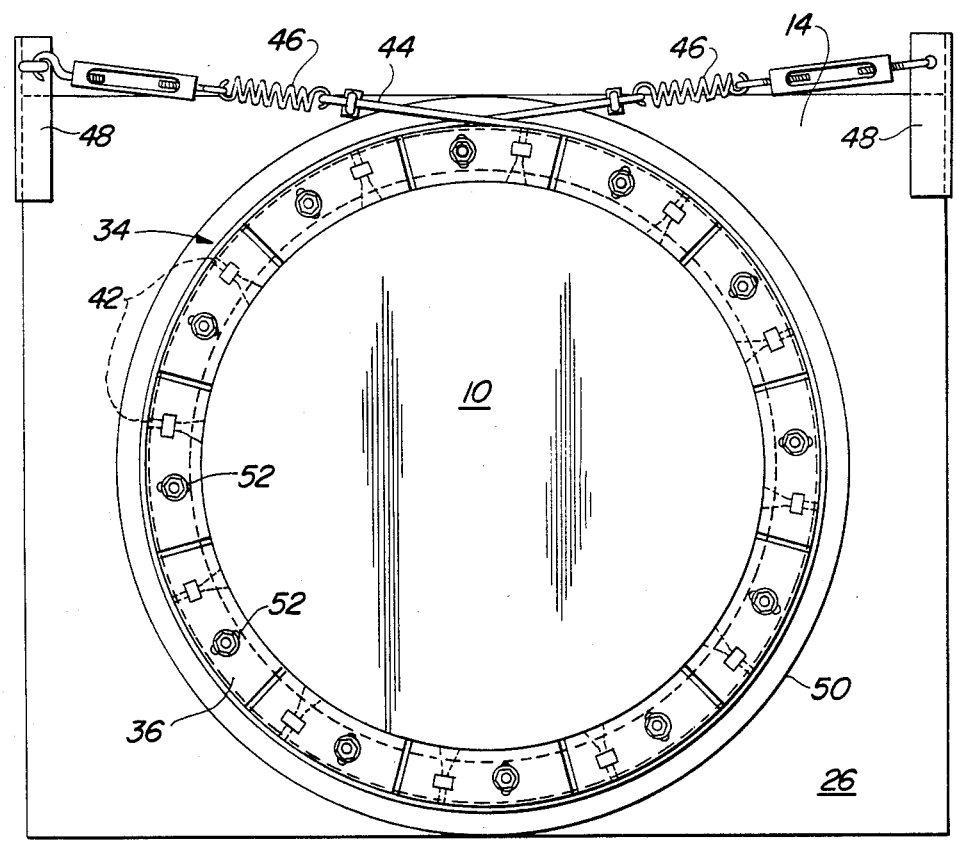
FIG. 2 is an enlarged end elevation as seen along the line 2—2 of FIG. 1

As best shown in FIGS. 2, 3 and 4, the housing (14) (which may be taken as typical also of the inlet housing (12) is formed with end walls (26) that are spaced axially and disposed radially as respects the axis of rotation of the shell (10). An annular band (28) surrounds and is fixed to these walls to provide a chamber (30) into which the associated end portion of the shell extends and this portion of the shell has therein a plurality of outlets or openings (32). It is in this area that the sealing problem exists as the material exits through these openings into the chamber for ultimate discharge and, unless, sealed, would tend to escape past the walls (26) prior to final discharge.

As respects the discharge area, there are two segmented seal rings, each designated in its entirety by the numeral (34). Because these are similar—in fact, mirror images of each other—only one will be described. Likewise, similar seals are provided at the inlet end, not shown with the same degree of particularity as those at the discharge housing (14). The seal ring encircles the shell and comprises a plurality of arcuate segments (36), disposed substantially end-to-end except that each pair of neighboring segments has mating end portions (38) configured to overlap at a radial and circumferential interface (40). Each segment has a radius on the order of that of the shell (10) and the circumferential length of each segment is such that, in addition to the plurality of the interfaces (40), there also exists a plurality of associated gaps (42). The segments are tensioned about the shell in such fashion as to hug the shell during operation, the tensioning means in this case comprising a cable (44) that engages and has a circumferential wrap about the segments. The cable has opposite ends adjustably connected by tension springs (46) to anchor points (48) affixed to the associated housing wall (26). Each wall is supplemented by having welded or otherwise rigidly attached thereto an annulus or continuous ring (50) to which the segmented ring is attached in such manner that the latter may have "floating" movement to accommodate high spots on the rotating shell (10). The form of attachment shown here comprises a plurality of slot and stud connections (52) (FIGS. 2 and 6) which allows limited but adequate radial movement of the individual segments, a characteristic which is not inhibited by the gap and interface relationship between the segment end portions (38). The cable wrap is accommodated by the provision of circumferentially-directed grooves (54) in the respective segments for receiving the cable as shown in FIGS. 3 and 4. In order to prevent undesirable tipping or cocking of the segments, the segment end portions are relieved radially inwardly at (56) and thus out of immediate contact with the cable in order to prevent undesirable circumferential spreading of the gap during the occurrence of high spots on the rotating shell.

When the end portions of neighboring segments are in assembled and operative relationship, the two faces (40) contact each other in such manner as to provide a leakproof interface. Each end portion at its end that cooperates with its neighbor to form the gap (42) is so configured that the gap has an interior relief or mouth (50); i.e., the gap is widened at its contact area with the outer surface of the shell. In the present case, this mouth results from the forming of the end portions respectively with convergent edges (60); i.e., these edges slope radially outwardly to meet straight parallel edges (62) that together provide a radial channel (64) that opens at the outer periphery of the segmented ring.

Unless sealed, of course, material would enter the mouths and exit at the outer ends of the channels. To prevent this, the invention combines with the novel mouth and channel arrangement a novel seal element, here in the form of an elastomer block (66). The segment end portions are appropriately notched at (68) and combine to receive and contribute to mounting the block. In that form of the invention shown in FIGS. 1-6 and 8, the notches extend axially through the respective segments. As to one segment, the block is retained by abutting the adjacent fixed ring (50) and as to the neighboring segment, the block is retained by a retainer element or tab (70) hingedly or detachably secured by a screw (72) to the associated segment.

In a modified form as shown in FIG. 7, neighboring segments (36') are provided with notches (68') to receive a seal block (66'). In this case, one notch opens all the way through so that the block abuts the associated fixed ring (50) as before but the other notch is "blind"; i.e. does not open through the segment and hence the tab or retainer is not required.

In a further modified form of the invention, the segmented ring may be constructed as before, except that in this case neighboring segments (36") are notched to receive a block (56") at the open end of the channel that is sealed by the block (66"). The purpose of the blocks (56") at the segment junctions is to receive the cable in such manner as to concentrate the cable tension more to the radially central area of the segments and thus to prevent spreading of the segments.

In all forms of the invention, it is significant that the sealing blocks are disposed at the respective junctions of the mouths (58) and associated channels (64) so as to confine material to the space bounded by the convergent mouth edges and block, thus preventing the material from passing the blocks and perhaps packing in the channels. The segments are preferably made of some suitable non-metallic material such as epoxy-impregnated cloth, which is found to possess substantial low-friction and long-wear characteristics. The block may be made of any suitable elastic having the qualities of long wear and sufficient flexibility as to accommodate "floating" of the neighboring segments spanned thereby. In that form of the invention of FIGS. 1-6 and 8, removal and replacement of blocks because of wear and the like is facilitated by the detachable or hinged tabs.

Features and advantages of the invention, other than those specifically noted herein will become apparent to those versed in the art, as will many modifications and alterations, all without departure from the spirit and scope of the invention.

I claim:

1. Rotary equipment including a cylinder rotatable about a horizontal axis, an upright fixed wall having an opening through which the cylinder extends, said wall having an annular radial surface bordering the opening, a segmented seal ring encircling the cylinder and effecting a seal between the outer circumference of the cylinder and the wall surface, said ring including a plurality of arcuate segments radially disposed about the cylinder and respectively having inner axial sealing surfaces on a radius approximately equal to that of the cylinder, each segment having an inner flat radial surface seating against the wall surface and each pair of neighboring segments having circumferentially overlapping end portions forming a gap and radial interface between the neighboring segments, means for mounting the segments individually on the upright wall and permitting radial displacement of the segments relative to each other during rotation of the cylinder, means for tensioning the segments to hug the cylinder, and sealing means for sealing the gaps, characterized in that the overlapping end portions of each pair of neighboring segments are so configured that the gap has a relatively circumferentially wide mouth opening at the cylinder surface and converging to a relatively narrow channel intermediate the inner and outer circumferences of the ring, said channel extending to an outer open end at said outer circumference of the ring, and the sealing means at each gap includes a resilient element bridging the gap at the junction between the mouth and its channel, and said element is carried in part by one segment and in part by the neighboring segment.

2. Rotary equipment according to claim 1, further characterized in that end portions at each gap respectively have circumferentially directed notches opening to the channel adjacent to the associated channel-mouth junction, and each sealing element is an elastomer block fitting the notches.

3. Rotary equipment according to claim 2, further characterized in that the notches also open axially toward the upright wall surface.

4. Rotary equipment according to claim 3, in which the notches also extend in the direction away from said wall but are blind-ended so as to prevent escape of the block.

5. Rotary equipment according to claim 3, in which the notches also extend in the direction away from the wall and open axially at the sides of the segments opposite to the aforesaid flat inner surface, and retaining means is provided on at least one segment of each neighboring pair for preventing escape of the associated block.

6. Rotary equipment according to claim 5, in which each retaining means includes a tab member disposed over the notches and fastening means securing each tab to a respective segment.

7. Rotary equipment according to claim 1, further characterized in that the means for tensioning the segments includes a cable engaging and having a circumferential wrap about the outer periphery of the segmented ring and the end portions of the segments are radially inwardly relieved to avoid engagement with the cable.

* * * * *